(12) United States Patent
Konishi

(10) Patent No.: US 12,447,123 B2
(45) Date of Patent: Oct. 21, 2025

(54) SOLID COSMETIC

(71) Applicant: SHIN-ETSU CHEMICAL CO., LTD., Tokyo (JP)

(72) Inventor: Masayuki Konishi, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 580 days.

(21) Appl. No.: 17/637,841

(22) PCT Filed: Aug. 21, 2020

(86) PCT No.: PCT/JP2020/031574
§ 371 (c)(1),
(2) Date: Feb. 24, 2022

(87) PCT Pub. No.: WO2021/039617
PCT Pub. Date: Mar. 4, 2021

(65) Prior Publication Data
US 2022/0273553 A1    Sep. 1, 2022

(30) Foreign Application Priority Data

Aug. 26, 2019   (JP) .................................. 2019-153649

(51) Int. Cl.
| | |
|---|---|
| *A61K 8/895* | (2006.01) |
| *A61K 8/02* | (2006.01) |
| *A61K 8/81* | (2006.01) |
| *A61K 8/92* | (2006.01) |
| *A61Q 1/06* | (2006.01) |

(52) U.S. Cl.
CPC ............ *A61K 8/895* (2013.01); *A61K 8/0225* (2013.01); *A61K 8/8111* (2013.01); *A61K 8/92* (2013.01); *A61Q 1/06* (2013.01); *A61K 2800/92* (2013.01)

(58) Field of Classification Search
None
See application file for complete search history.

(56) References Cited

U.S. PATENT DOCUMENTS

| | | | |
|---|---|---|---|
| 2004/0044121 A1* | 3/2004 | Kadlec ................... | A61Q 15/00 524/588 |
| 2012/0237467 A1 | 9/2012 | Sasada et al. | |
| 2014/0105840 A1 | 4/2014 | Tomita et al. | |
| 2017/0290760 A1* | 10/2017 | Nakano .................. | A61Q 1/06 |
| 2020/0306157 A1* | 10/2020 | Biswas ................... | A61K 8/342 |
| 2020/0332065 A1 | 10/2020 | Abe et al. | |
| 2020/0375874 A1 | 12/2020 | Naoi et al. | |
| 2021/0290505 A1* | 9/2021 | Shimizu ................. | A61Q 1/06 |

FOREIGN PATENT DOCUMENTS

| | | |
|---|---|---|
| JP | 2012-250927 A | 12/2012 |
| JP | 5280490 B2 | 9/2013 |
| JP | 2015-520119 A | 7/2015 |
| JP | 2016-56173 A | 4/2016 |
| JP | 6231748 B2 | 11/2017 |
| JP | 2019-26615 A | 2/2019 |
| WO | WO 2018/198800 A1 | 11/2018 |
| WO | WO 2017/199732 A1 | 12/2018 |
| WO | 2019/107497 A1 | 6/2019 |

OTHER PUBLICATIONS

International Search Report, issued in PCT/JP2020/031574, dated Oct. 13, 2020.
Lip CC lipstick, ID 5437741, Mintel GNFD[online], Feb. 2018, [retrieval date Sep. 23, 2020], internet<https://www.portal.mintel.com>, total 2 pages.
Lip Velvet, ID 4725639, Mintel GNPD[online], Mar. 2017, [retrieval date Sep. 23, 2020], internet<https://www.portal.mintel.com>, total 2 pages.
Written Opinion of the International Searching Authority, issued in PCT/JP2020/031574, dated Oct. 13, 2020.
Japanese Office Action for Japanese Application No. 2021-542831, dated Mar. 28, 2023.
Extended European Search Report for corresponding European Application No. 20856227.2, dated Aug. 23, 2023.
Office Action issued Feb. 23, 2024, in Chinese Patent Application No. 202080060392.4.

* cited by examiner

*Primary Examiner* — Danah Al-Awadi
(74) *Attorney, Agent, or Firm* — Birch, Stewart, Kolasch & Birch, LLP

(57) ABSTRACT

A solid cosmetic that has an excellent glossy feeling, excellent adhesion, and excellent storage stability and provides an excellent sensation when used. The solid cosmetic contains
(a) diphenylsiloxy phenyl trimethicone,
(b) a hydrogenated polyisobutene that is soluble with component (a),
(c) at least one of isotridecyl isononanoate, isononyl isononanoate, triethylhexanoin, ethylhexyl palmitate, caprylic/capric triglyceride, neopentyl glycol dicaprate, diisostearyl malate, mineral oil, polyglyceryl polyisostearate, and sorbitan sesquiisostearate, and
(d) wax.

5 Claims, No Drawings

SOLID COSMETIC

TECHNICAL FIELD

This invention relates to a solid cosmetic composition. Herein, the cosmetic composition is also referred to as cosmetics.

BACKGROUND ART

Solid cosmetics containing a solidifying component such as wax are required to be finished to provide a pleasant feeling on use and particularly in the case of lip cosmetics, further required to have gloss and adhesion. For the purpose of imparting gloss and adhesion, a method of combining a phenyl silicone with a highly polymerized hydrocarbon oil, ester oil or the like and solidifying them with wax or the like is known. However, those components which are likely to impart gloss and adhesion tend to be poorly compatible with each other. For example, the technique of forming an oil-in-oil like state and solidifying it with wax or the like is known from Patent Document 1: JP 5280490. Also, the technique of mixing a predetermined amount of phenyl-containing polysiloxane for the purpose of improving the transparency of wax is known from Patent Document 2: JP 6231748. These techniques, however, are insufficient from the standpoints of gloss and adhesion.

PRIOR ART DOCUMENTS

Patent Documents

Patent Document 1: JP 5280490
Patent Document 2: JP 6231748

SUMMARY OF INVENTION

Technical Problem

An object of the invention, which has been made under the above-mentioned circumstances, is to provide a solid cosmetic composition having excellent gloss, adhesion, feeling on use, and storage stability.

Solution to Problem

Phenyl silicone having excellent gloss and hydrogenated polyisobutene having excellent adhesion are difficultly compatible, depending on their molecular weight and structure, and also less compatible with other oils. In the case of solid cosmetic compositions composed of highly compatible oils, improvements in feeling on use and storage stability are expectable from the uniformity of wax structures in oils. The inventor has found that the outstanding problem can be solved by combining a specific phenyl silicone having excellent gloss, hydrogenated polyisobutene having excellent adhesion which is soluble therewith, and a specific compound. The invention is predicated on this finding.

Accordingly, the invention provides a solid cosmetic composition as defined below.

1. A solid cosmetic composition comprising
   (a) diphenylsiloxy phenyl trimethicone,
   (b) hydrogenated polyisobutene which is soluble with component (a),
   (c) at least one member selected from among isotridecyl isononanoate, isononyl isononanoate, triethylhexanoin, ethylhexyl palmitate, caprylic/capric triglyceride, neopentyl glycol dicaprate, diisostearyl malate, mineral oil, polyglyceryl polyisostearate, and sorbitan sesquiisostearate, and
   (d) wax.
2. The solid cosmetic composition of 1 wherein the content of component (a) is 5 to 50% by weight of the solid cosmetic composition.
3. The solid cosmetic composition of 1 or 2 wherein the content of component (b) is 0.5 to 30% by weight of the solid cosmetic composition.
4. The solid cosmetic composition of any one of 1 to 3, further comprising (e) a phenyl silicone other than component (a), wherein the components are combined such that when components (a), (b), (c), and (e) are mixed, component (e) is soluble with the other components.
5. The solid cosmetic composition of any one of 1 to 4, further comprising (f) a silicone powder.
6. The solid cosmetic composition of any one of 1 to 5, for use on lips.

Advantageous Effects of Invention

According to the invention, a solid cosmetic composition having excellent gloss, adhesion, feeling on use, and storage stability is provided.

DESCRIPTION OF EMBODIMENTS

Now the invention is described in detail. It is noted that the solid cosmetic composition is simply referred to as cosmetic or cosmetic composition, hereinafter. Some compound names are described by the International Nomenclature for Cosmetic Ingredients (INCI).

[Component (a)]

Component (a) used herein is diphenylsiloxy phenyl trimethicone as defined in INCI. One commercial product is KF-56A by Shin-Etsu Chemical Co., Ltd.

The content of component (a) is preferably 5 to 50% by weight, more preferably 6 to 35% by weight of the cosmetic composition. The content is even more preferably 6% by weight to less than 20% by weight when various components commonly used in cosmetics such as pigments and aqueous components are blended. Insofar as the content is at least 5% by weight, more compatibility among components and gloss are available. Insofar as the content is up to 50% by weight, more adhesion is available.

[Component (b)]

Component (b) used herein is a hydrogenated polyisobutene as defined in INCI, which is soluble with component (a) and compatible with component (a). It is preferably composed of 3 to 24 monomers, and as viewed from gloss, more preferably 6 to 24 monomers, most preferably 18 monomers. The polyisobutene may be used alone or in admixture of two or more. It is noted that the phrase "soluble with component (a)" is described later.

The content of component (b) is preferably 0.5 to 30% by weight of the cosmetic composition. The content is more preferably 0.5 to 15% by weight, even more preferably 0.5 to 5% by weight when various components commonly used in cosmetics such as pigments and aqueous components are blended. Insofar as the content is at least 0.5% by weight, more adhesion is available. Insofar as the content is up to 30% by weight, more compatibility among components is available.

[Component (c)]

Component (c) used herein is at least one member selected from among isotridecyl isononanoate, isononyl isononanoate, triethylhexanoin, ethylhexyl palmitate, caprylic/capric triglyceride, neopentyl glycol dicaprate, diisostearyl malate, mineral oil, polyglyceryl polyisostearate, and sorbitan sesquiisostearate, as defined in INCI, with a combination of two or more being acceptable. The polyglyceryl polyisostearate encompasses polyglyceryl-2 triisostearate, polyglyceryl-2 diisostearate, and polyglyceryl-3 diisostearate.

The content of component (c) is preferably 5 to 60% by weight, more preferably 10 to 55% by weight, even more preferably 15 to 50% by weight of the cosmetic composition. Insofar as the content is at least 5% by weight, more compatibility is available. Insofar as the content is up to 60% by weight, more gloss and adhesion are available.

Component (b) is hydrogenated polyisobutene which is soluble with component (a), diphenylsiloxy phenyl trimethicone. That is, when components (a) and (b) are mixed, they merge with and dissolve in each other. In the combination of (a) to (c), a combination that when components (a), (b) and (c) are mixed, they are soluble in each other is included, whereas a combination that when only components (a) and (b) are mixed, they are insoluble in each other is excluded. The phrases that "component (b) is soluble with component (a)" and that "when components (a), (b) and (c) are mixed, they are soluble in each other" mean that when components are mixed in a weight ratio of 1:1 or 1:1:1, heated and mixed at 85° C., and allowed to stand at 25° C. for 1 hour, the mixture may take either a transparent to semitransparent state without interface, which is referred to as "soluble", or a white turbid or separate two-layer state, which is referred to as "insoluble". With respect to transparency, a mixture is judged transparent to semitransparent when a transmittance of at least 50% is measured according to JIS K7361 using a cell of 1 cm thick filled with the mixture.

[Component (d)]

Component (d) used herein is a wax, which is selected from waxes, sugar fatty acid esters, and higher alcohols, which may be used alone or in admixture of two or more.

Suitable waxes include ceresin, ozokerite, microcrystalline wax, synthetic hydrocarbon waxes such as polyethylene wax, plant-derived waxes such as carnauba wax, rice wax, rice bran wax, jojoba wax and candelilla wax, animal-derived waxes such as beeswax, and silicone wax.

Suitable sugar fatty acid esters include dextrin fatty acid esters such as dextrin palmitate, dextrin stearate, dextrin 2-ethylhexanoate palmitate; sucrose fatty acid esters such as sucrose palmitate and sucrose stearate; and fructo-oligosaccharide fatty acid esters such as fructo-oligosaccharide stearate and fructo-oligosaccharide 2-ethylhexanoate.

Suitable higher alcohols include cetyl alcohol, stearyl alcohol, arachidyl alcohol and behenyl alcohol.

The content of component (d) is preferably 1 to 25% by weight, more preferably 3 to 20% by weight, even more preferably 5 to 18% by weight of the cosmetic composition. Insofar as the content is at least 1% by weight, the desired hardness is obtained, and shape retention is easy. Insofar as the content is up to 25% by weight, easier application and better feeling on use are available.

[Component (e)]

Component (e) used herein is a phenyl silicone other than component (a), which is combined such that when components (a), (b), (c) and (e) are mixed, they are soluble in each other. The phenyl silicone is not particularly limited as long as it is commonly used in cosmetics, and may be used alone or in admixture of two or more. The phrase that "when components (a), (b), (c) and (e) are mixed, they are soluble in each other" refers, in the same context as above, to the case where the components are mixed in a weight ratio (a):(b):(c):(e)=1:1:1:1. Examples of the phenyl silicone other than component (a) include diphenyl dimethicone, phenyl dimethicone, trimethylsiloxy phenyl dimethicone, phenyl trimethicone, and trimethylpentaphenyl trisiloxane as defined in INCI. Inter alia, diphenyl dimethicone is preferred from the standpoint of imparting gloss. Commercial products include KF-50-100cs, 1000cs, KF-53, 54, 54HV (all from Shin-Etsu Chemical Co., Ltd.). Inter alia, KF-54 and 54HV are preferred from the standpoint of imparting gloss.

When used, the content of component (e) is preferably 0.1 to 10% by weight, more preferably 0.5 to 8% by weight, even more preferably 1 to 5% by weight of the cosmetic composition. A content of up to 10% by weight is preferred from the standpoint of compatibility.

[Component (f)]

In the cosmetic composition, (0 silicone powder is preferably blended. Blending of component (0 sometimes leads to a smoothened feeling and improved finish. By controlling a coating thickness during application of the cosmetic composition, the finish can be adjusted from a glossy finish to a matte finish. The silicone powder is not particularly limited as long as it is commonly used in cosmetics.

Examples include crosslinked silicone powder (organopolysiloxane of the structure that repeating chains of diorganosiloxane units are crosslinked, commonly known as silicone rubber powder) and silicone resin particles (polyorganosilsesquioxane resin particles of three-dimensional network structure). More specific examples include dimethicone/vinyl dimethicone crosspolymer and polymethylsilsesquioxane as defined in the INCI. They are commercially available in powder form or silicone oil-swollen form under the tradename of KMP-598, 590, 591, 592, and KSG-016F (all from Shin-Etsu Chemical Co., Ltd.).

Among the silicone powders, a silicone resin-coated silicone rubber powder is more preferred in view of a feel improving effect such as anti-sticking effect and an effect of correcting skin unevenness (e.g., wrinkle or pores). Examples of the silicone resin-coated silicone rubber powder include those known under the names of (vinyl dimethicone/methicone silsesquioxane) crosspolymer, (diphenyl dimethicone/vinyl diphenyl dimethicone/silsesquioxane) crosspolymer, polysilicone-22, and polysilicone-1 crosspolymer, as defined in the INCI. They are commercially available under the tradename of KSP-100, 101, 102, 105, 300, 411, and 441 (all from Shin-Etsu Chemical Co., Ltd.). These powders may be used alone or in admixture.

<Additional Components>

In the cosmetic composition of the invention, various components which are commonly used in cosmetics may be blended as additional components. Suitable additional components include, for example, (1) crosslinked silicones, (2) powders other than component (f), (3) surfactants, (4) film formers, (5) aqueous components, (6) oils other than components (a), (b), (c) and (d), and (7) other additives, which may be used alone or in suitable combination. Among these additional components, any components may be chosen and used depending on the type of cosmetic composition. Where the content is not specified, the content may be a well-known content corresponding to the type of cosmetic composition.

(1) Crosslinked Silicone

Crosslinked silicones include partially crosslinked methylpolysiloxane, partially crosslinked polyether-modified silicone, and partially crosslinked polyglycerin-modified silicone, which may be used alone or in suitable combination. Examples include KSG-210, 240, 310, 320, 330, 340, 320Z, 350Z, 710, 810, 820, 830, 840, 820Z, 850Z, 15, 1510, 16, 1610, 18A, 19, 41A, 42A, 43, 44, 042Z, 045Z, and 048Z, from Shin-Etsu Chemical Co., Ltd. When used, the content of crosslinked silicone is preferably 0.1 to 20% by weight, more preferably 0.2 to 15% by weight, even more preferably 0.5 to 10% by weight, calculated as solids, of the cosmetic composition.

(2) Powder Other than Component (f)

The powder is not particularly limited as long as it is an ingredient commonly used in cosmetics. Suitable powders include pigments and UV scattering agents. When used, the content of powder is preferably 0.1 to 30% by weight, more preferably 1 to 15% by weight of the cosmetic composition though not particularly limited.

Pigment

The pigment is not particularly limited as long as it is commonly used in make-up cosmetics. Examples include inorganic pigments such as talc, mica, sericite, synthetic fluorophlogopite, barium sulfate, aluminum oxide, kaolin, silica, calcium carbonate, zinc oxide, titanium oxide, red iron oxide, yellow iron oxide, black iron oxide, ultramarine, Prussian blue, carbon black, substoichiometric titanium oxide, cobalt violet, chromium oxide, chromium hydroxide, cobalt titanate, bismuth oxychloride, and titanium-mica base pearl pigment; organic pigments in the form of zirconium, barium or aluminum lake such as Red #201, Red #202, Red #204, Red #205, Red #220, Red #226, Red #228, Red #405, Orange #203, Yellow #205, Yellow #4, Yellow #5, Blue #1, Blue #404, and Green #3; natural dyestuffs such as chlorophil and β-carotin; and dyes. The pigment is blended as a coloring or extending agent particularly in the case of lipstick.

The powder may also be used in the form of particles whose surface has been treated. The surface treating agent used herein is preferably an agent capable of imparting hydrophobic properties, as viewed from the aim of not detracting from the water resistance of preparations. The surface treating agent is not particularly limited as long as it can impart hydrophobic properties. Exemplary treating agents include silicone treating agents, waxes, paraffins, organic fluorine compounds such as perfluoroalkyl and phosphate salts, surfactants, amino acids such as N-acylglutamic acid, and metal soaps such as aluminum stearate and magnesium myristate. Among others, silicone treating agents are preferred, examples of which include silanes or silylating agents such as capryl silane (AES-3083 by Shin-Etsu Chemical Co., Ltd.) and trimethoxysilyl dimethicone; silicone oils such as dimethylsilicone (KF-96A series by Shin-Etsu Chemical Co., Ltd.), methylhydrogen polysiloxane (KF-99P and KF-9901 by Shin-Etsu Chemical Co., Ltd.), silicone branched silicone treating agents (KF-9908 and KF-9909 by Shin-Etsu Chemical Co., Ltd.); and acrylic silicones (KP-574 and KP-541 by Shin-Etsu Chemical Co., Ltd.). The surface hydrophobizing agents may be used alone or in admixture. Examples of the surface-treated coloring pigment include KTP-09 series, specifically KTP-09W, 09R, 09Y and 09B by Shin-Etsu Chemical Co., Ltd.

UV Scattering Agent

The UV scattering agent is not particularly limited as long as it is an ingredient commonly used in cosmetics. Examples include titanium oxide, zinc oxide, and cerium oxide. The UV scattering agent has an average primary particle size of up to 200 nm unlike the above pigment. The UV scattering agent which has been hydrophobized with silicone may also be used. Examples of the hydrophobized inorganic powder include dispersions of hydrophobized microparticulate titanium oxide and hydrophobized microparticulate zinc oxide, which are commercially available under the tradename of SPD-T5, T6, TSL, Z5, Z6, and Z5L from Shin-Etsu Chemical Co., Ltd.

(3) Surfactant

The surfactant is not particularly limited as long as it is an ingredient commonly used in cosmetics. Suitable surfactants include nonionic, anionic, cationic, and ampholytic surfactants, which may be used alone or in suitable combination. Of these surfactants, preferred are linear or branched polyoxyethylene-modified organopolysiloxanes, linear or branched polyoxyethylenepolyoxypropylene-modified organopolysiloxanes, linear or branched polyoxyethylene/alkyl-co-modified organopolysiloxanes, linear or branched polyoxyethylenepolyoxypropylene/alkyl-co-modified organopolysiloxanes, linear or branched polyglycerin-modified organopolysiloxanes, and linear or branched polyglycerin/alkyl-co-modified organopolysiloxanes. In these surfactants, the content of hydrophilic polyoxyethylene group, polyoxyethylenepolyoxypropylene group or polyglycerin residue is preferably 10 to 70% by weight of the molecule. Examples of the surfactant include KF-6011, 6013, 6017, 6043, 6028, 6038, 6048, 6100, 6104, 6105, and 6106 by Shin-Etsu Chemical Co., Ltd. When used, the content of surfactant is preferably 0.01 to 15% by weight of the cosmetic composition.

(4) Film Former

The film former is not particularly limited as long as it is an ingredient commonly used in cosmetics. Examples include latexes such as polyvinyl alcohol, polyvinyl pyrrolidone, polyvinyl acetate, and poly(alkyl acrylates), cellulose derivatives such as dextrin, alkyl celluloses, and nitrocellulose, silicone-modified polysaccharides such as pullulan tri(trimethylsiloxy)silylpropylcarbamate, acrylic silicone graft copolymers such as alkyl acrylate/dimethicone copolymers, silicone resins such as trimethylsiloxysilicic acid, silicone based resins such as silicone-modified polynorbornene and fluorine-modified silicone resins, fluoroplastics, aromatic hydrocarbon resins, polymer emulsion resins, terpene based resins, polybutene, polyisoprene, alkyd resins, polyvinyl pyrrolidone-modified polymers, rosin-modified resins, and polyurethane.

Of these, silicone-based film formers are preferred. Preferred examples include, but are not limited to, pullulan tri(trimethylsiloxy)silylpropylcarbamate (commercially available in solution form as TSPL-30-D5, ID by Shin-Etsu Chemical Co., Ltd.), alkyl acrylate/dimethicone copolymers (commercially available in solution form as KP-543, 545, 549, 550, 545L by Shin-Etsu Chemical Co., Ltd.), trimethylsiloxysilicic acid (commercially available in solution form as KF-7312J and X-21-5250 by Shin-Etsu Chemical Co., Ltd.), silicone-modified polynorbornene (commercially available in solution form as NBN-30-ID by Shin-Etsu Chemical Co., Ltd.), and organosiloxane grafted polyvinyl alcohol polymers. When used, the content of film former is preferably 0.1 to 20% by weight of the cosmetic composition.

(5) Aqueous Component

The aqueous component is not particularly limited as long as it is an ingredient commonly used in cosmetics. Examples include water and humectants such as lower alcohols, sugar alcohols and polyhydric alcohols. When used, the content of aqueous component is preferably 0.1 to 30% by weight of the cosmetic composition. It is noted that sometimes dispersibility is improved by adding a small amount of water to a dispersion. When water is added to the dispersion, the content is preferably up to 1% by weight, more preferably up to 0.5% by weight of the dispersion.

(6) Oil Other than Components (a), (b), (c), and (d)

The oil other than components (a), (b), (c), and (d) may be either semisolid or liquid at room temperature. Examples include silicone oils, ester oils such as naturally occurring animal and plant oils and fats, and semi-synthetic oils and fats, fluorine based oils, hydrocarbon oils, and UV absorbers. When used, the content of oil is preferably 1 to 50% by weight, more preferably 15 to 40% by weight of the cosmetic composition.

Silicone Oil

The silicone oil is not particularly limited as long as it is an ingredient commonly used in cosmetics. Examples include linear or branched organopolysiloxanes having a low to high viscosity such as dimethylpolysiloxane, methylhexylpolysiloxane, methylhydrogenpolysiloxane, and dimethylsiloxane-methylphenylsiloxane copolymers, and amino-modified organopolysiloxanes. Of these, preferred are volatile silicones and low-viscosity silicones capable of providing a fresh feeling on use (commercially available as KF-995, KF-96L-1.5, 2 cs, and KF-96A-6cs from Shin-Etsu Chemical Co., Ltd.), and acrylic silicones used for the purposes of improving compatibility with other oils and delivering luster (commercially available as KP-561P and 562P from Shin-Etsu Chemical Co., Ltd.).

Ester Oil

The ester oil is not particularly limited as long as it is an ingredient commonly used in cosmetics. Examples include pentaerythrityl tetraisostearate, pentaerythrityl tetraethylhexanoate, triisostearin, trimethylolpropane triisostearate, dipentaerythrityl hexahydroxystearate/hexastearate/hexarosinate, dipentaerythrityl tetrahydroxystearate/tetraisostearate, dipentaerythrityl hexahydroxystearate, jojoba oil, macadamia nut oil, cetyl ethylhexanoate, and lanolin.

Hydrocarbon Oil

The hydrocarbon oil is not particularly limited as long as it is an ingredient commonly used in cosmetics. Examples include isododecane, undecane, isohexadecane, polybutene, squalane, and vaseline.

UV Absorber

Suitable UV absorbers include homomenthyl salicylate, octocrylene, 4-tert-butyl-4'-methoxydibenzoylmethane, 4-(2-β-glucopyranosiloxy)propoxy-2-hydroxybenzophenone, octyl salicylate, hexyl 2-[4-(diethylamino)-2-hydroxybenzoyl]benzoate, dihydroxydimethoxybenzophenone, sodium dihydroxydimethoxybenzophenonedisulfonate, dihydroxybenzophenone, dimethicodiethylbenzal malonate, 1-(3,4-dimethoxyphenyl)-4,4-dimethyl-1,3-pentanedione, 2-ethylhexyl dimethoxybenzylidenedioxoimidazolidinepropionate, tetrahydroxybenzophenone, terephthalylidene dicamphor sulfonic acid, 2,4,6-tris[4-(2-ethylhexyloxycarbonyl)anilino]-1,3,5-triazine, methylbis(trimethylsiloxy)silylisopentyl trimethoxycinnamate, drometrizole trisiloxane, 2-ethylhexyl p-dimethylaminobenzoate, isopropyl p-methoxycinnamate, 2-ethylhexyl p-methoxycinnamate, 2,4-bis[{4-(2-ethylhexyloxy)-2-hydroxy}-phenyl]-6-(4-methoxyphenyl)-1,3,5-triazine, 2-hydroxy-4-methoxybenzophenone, hydroxymethoxybenzophenone sulfonic acid and trihydrate thereof, sodium hydroxymethoxybenzophenone sulfonate, phenylbenzimidazole sulfonic acid, and 2,2'-methylenebis(6-(2H-benzotriazol-2-yl)-4-(1,1,3,3-tetramethylbutyl)phenol). Also, a UVA absorber (e.g., hexyl diethylaminohydroxybenzoylbenzoate) may be combined with a UVB absorber (e.g., ethylhexyl methoxycinnamate). Any two or more of the foregoing may be used in combination.

(7) Other Additives

Other additives include oil-soluble gelling agents, antiperspirants, preservatives, bactericides, perfumes, salts, antioxidants, pH adjusting agents, chelating agents, refreshing agents, anti-inflammatory agents, skin improving agents (brightening agent, cell activating agent, anti-skin-roughening agent, blood flow promotor, skin astringent, antiseborrheic agent), vitamins, amino acids, water-soluble polymers, fibers, and inclusion compounds.

Oil-Soluble Gelling Agent

Suitable oil-soluble gelling agents include metal soaps such as aluminum stearate, magnesium stearate, and zinc myristate; amino acid derivatives such as N-lauroyl-L-glutamic acid and α,γ-di-n-butylamine; and organo-modified clay minerals such as disteardimonium hectorite, stearalkonium hectorite and hectorite.

[Method of Preparing Cosmetic Composition]

The cosmetic composition of the invention may be prepared, for example, by heat mixing components (a) to (d), followed by cooling. Components (e) and (O and other optional components may be mixed at the same time as components (a) to (d) or after components (a) to (d) are uniformly mixed, in a standard manner.

The cosmetic composition may be either of non-aqueous or emulsion system, without any particular limits, as long as it is solid. The emulsion may be either W/O emulsion or O/W/O emulsion. The non-aqueous system is preferred in view of shaping whereas the emulsion system is preferred when freshness is desired. The term "solid" refers to a non-flowing state. The form may be selected from various forms including cast, stick, pencil, chip, and compact types.

The cosmetic composition is applicable to various preparations. For example, the cosmetic composition may be implemented as toilet water, lotion, cream, massage cream, pack, hair care, foundation, foundation primer, balm, cheek color, lip, eyeliner, body makeup, etc., and such products additionally endowed with a sun-screening effect. Of these, lip cosmetics including lipstick, lip color, lip cream, lip base and lip gloss are preferred because gloss and adhesion are available.

EXAMPLES

Examples and Comparative Examples are shown below for further illustrating the invention although the invention is not limited thereto. In Examples, compositional percent (%) is by weight unless otherwise stated.

[Preparation and Evaluation of Oil Admixture]

An admixture of oil components shown in Table 2, which is obtained by combining components in a weight ratio of 1:1 or 1:1:1, heat mixing at 85° C., and holding static at 25° C. for 1 hour, is judged "soluble" when it takes a transparent to semitransparent state without interface, and "insoluble" when it takes a white turbid or separate two-layer state. The symbol "0" indicates "soluble" and "x" indicates "insoluble".

Examples 1 to 10, Comparative Examples 1 to 5

A solid cosmetic composition was obtained by mixing the components shown in Tables 3 and 4 at 95° C. until uniform, and cooling.

The resulting solid cosmetic composition was evaluated by the following tests. The results are also shown in Tables 3 and 4. The amount of a component blended is the amount of the designated product blended.

(1) Property Evaluation

The solid cosmetic compositions of Examples and Comparative Examples were evaluated in terms of gloss (good finish), adhesion (good adhesion upon application), and feeling on use (good spread without harshness) by a panel of ten panelists according to the rating shown in Table 1. The result was judged according to the following judgment criterion based on the average point of ten panelists.

TABLE 1

| Point | Gloss | Adhesion | Feeling on use |
|---|---|---|---|
| 5 | good | good | good |
| 4 | rather good | rather good | rather good |
| 3 | mediocre | mediocre | mediocre |

TABLE 1-continued

| Point | Gloss | Adhesion | Feeling on use |
|---|---|---|---|
| 2 | rather poor | rather poor | rather poor |
| 1 | poor | poor | poor |

(2) Judgment Criterion
⊚: average point≥4.5
○: 3.5≤average point<4.5
Δ: 2.5≤average point<3.5
X: 1.5≤average point<2.5
xx: average point<1.5
A sample is judged Pass for "Δ" or above.

(3) Storage Stability

After a 30-ml vial was filled with a solid cosmetic composition and stored in a thermostat vessel at 50° C. for 1 month, the composition was observed for state with naked eyes, and examined for feeling on use by coating it to the skin. It was rated "x" when it gives rise to problems like separation, perspiration and feeling changes, and "⊚" for no problems.

TABLE 2

| Components (weight ratio) | Oil admixture | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| (a) Diphenylsiloxy phenyl trimethicone*1 | 1 | 1 | 1 | 1 | 1 | 1 | 1 | 1 | 1 | 1 | 1 | 1 | | | 1 | 1 |
| (b) Hydrogenated polyisobutene (18 monomers) | 1 | 1 | 1 | 1 | 1 | 1 | 1 | 1 | 1 | 1 | 1 | 1 | 1 | | | |
| (b) Hydrogenated polyisobutene (6 monomers) | | | | | | | | | | | | | | 1 | | |
| Hydrogenated polyisobutene (46 monomers) | | | | | | | | | | | | | | | | 1 |
| (c) Isotridecyl isononanoate | | | 1 | | | | | | | | | | | | 1 | |
| (c) Isononyl isononanoate | | | | 1 | | | | | | | | | | | | |
| (c) Triethylhexanoine | | | | | 1 | | | | | | | | | | | |
| (c) Ethylhexyl palmitate | | | | | | 1 | | | | | | | | | | |
| (c) caprylic/capric triglyceride | | | | | | | 1 | | | | | | | | | |
| (c) neopentyl glycol dicaprate | | | | | | | | 1 | | | | | | | | |
| (c) diisostearyl malate | | | | | | | | | 1 | | | | | | | |
| (c) mineral oil | | | | | | | | | | 1 | | | | | | |
| (c) polyglyceryl-2 triisostearate | | | | | | | | | | | 1 | | | | | |
| (c) sorbitan sesquiisostearate | | | | | | | | | | | | 1 | | | | |
| Dimethicone (100 cs) | | | | | | | | | | | | | 1 | | | |
| (e) Diphenyl dimethicone*2 | | | | | | | | | | | | | | 1 | 1 | |
| Solubility of oil | ⊚ | ⊚ | ⊚ | ⊚ | ⊚ | ⊚ | ⊚ | ⊚ | ⊚ | ⊚ | ⊚ | ⊚ | X | X | ⊚ | X |

*1KF-56A (Shin-Etsu Chemical Co., Ltd.)
*2KF-54 (Shin-Etsu Chemical Co., Ltd.)

TABLE 3

| Component | Example | | | | | | | | | |
|---|---|---|---|---|---|---|---|---|---|---|
| | 1 | 2 | 3 | 4 | 5 | 6 | 7 | 8 | 9 | 10 |
| Oil admixture 2 | 90 | | | | | | | | | |
| Oil admixture 3 | | 90 | | | | | | | | |
| Oil admixture 4 | | | 90 | | | | | | | |
| Oil admixture 5 | | | | 90 | | | | | | |
| Oil admixture 6 | | | | | 90 | | | | | |
| Oil admixture 7 | | | | | | 90 | | | | |
| Oil admixture 8 | | | | | | | 90 | | | |
| Oil admixture 9 | | | | | | | | 90 | | |
| Oil admixture 10 | | | | | | | | | 90 | |
| Oil admixture 11 | | | | | | | | | | 90 |
| (d) polyethylene wax | 10 | 10 | 10 | 10 | 10 | 10 | 10 | 10 | 10 | 10 |
| Total | 100 | 100 | 100 | 100 | 100 | 100 | 100 | 100 | 100 | 100 |
| Gloss | ○ | ○ | ⊚ | ⊚ | ⊚ | ⊚ | ⊚ | ⊚ | ⊚ | ⊚ |
| Adhesion | ○ | ○ | ○ | ○ | ○ | ○ | ⊚ | ⊚ | ○ | ○ |
| Feeling on use | ○ | ⊚ | ⊚ | ⊚ | ⊚ | ⊚ | ⊚ | ○ | ⊚ | ⊚ |
| Storage stability | ⊚ | ⊚ | ⊚ | ⊚ | ⊚ | ⊚ | ⊚ | ⊚ | ⊚ | ⊚ |

TABLE 4

| Component | Comparative Example | | | | |
|---|---|---|---|---|---|
| | 1 | 2 | 3 | 4 | 5 |
| Oil admixture 12 | 90 | | | | |
| Oil admixture 13 | | 90 | | | |
| Oil admixture 14 | | | 90 | | |
| Oil admixture 15 | | | | 90 | |
| Oil admixture 16 | | | | | 90 |
| (d) polyethylene wax | 10 | 10 | 10 | 10 | 10 |
| Total | 100 | 100 | 100 | 100 | 100 |
| Gloss | Δ | ⊚ | X | Δ | ⊚ |
| Adhesion | Δ | ○ | XX | X | ○ |
| Feeling on use | XX | X | ⊚ | ⊚ | X |
| Storage stability | X | X | ⊚ | ⊚ | X |

It is evident from the above results that the solid cosmetic compositions of Examples 1 to 10 are satisfactory in gloss (good finish), adhesion (good adhesion upon application), feeling on use (good spread without harshness), and storage stability (50° C./1 month).

Comparative Example 1 in which component (b) is soluble with component (a) and which does not contain component (c) and Comparative Example 2 which contains component (e) which is phenyl silicone other than component (a) and insoluble with component (b) show unfavorable feeling on use and storage stability. Comparative Example 3 in which component (e) is soluble with component (b) and which does not contain component (c) and Comparative Example 4 which does not contain component (b) fail to provide satisfactory gloss and adhesion. Comparative Example 5 in which hydrogenated polyisobutene is insoluble with component (a) and which does not contain component (c) shows unfavorable feeling on use and storage stability.

Examples shown below are such combinations of components that when components (a) and (b) are mixed, they are soluble; when components (a), (b) and (c) are mixed, they are soluble; and in case of further blending component (e), when components (a), (b), (c) and (e) are mixed, they are soluble. It is noted that the amount of a component blended is the amount of the designated product blended, and the total of component (a) and the total of component (b) are net amounts.

Example 11

Lipstick
<Preparation of Cosmetic Composition>
A lipstick was obtained by
A: dispersing components 13 to 21 on a three-roll mill,
B: uniformly mixing components 1 to 12 at 95° C., and
C: adding component 22 and A to B, mixing at 85° C., filling in a mold, and cooling.

| | Formulation | % |
|---|---|---|
| 1. | candelilla wax | 4 |
| 2. | polyethylene wax | 2 |
| 3. | microcrystalline wax | 3 |
| 4. | ceresin | 5 |
| 5. | diphenylsiloxy phenyl trimethicone (*1) | balance |
| 6. | hydrogenated polyisobutene (18 monomers) | 20 |
| 7. | diphenyl dimethicone (*2) | 1 |
| 8. | silicone wax (*3) | 15 |
| 9. | triisostearin | 2 |
| 10. | diisostearyl malate | 7 |
| 11. | tocopherol acetate | 0.1 |
| 12. | acrylic silicone grafted copolymer (*4) | 2 |
| 13. | isotridecyl isononanoate | 5 |
| 14. | polyglyceryl-2 triisostearate | 2.4 |
| 15. | Red #201 | 0.4 |
| 16. | Red #202 | 0.4 |
| 17. | Yellow #4 | 1.6 |
| 18. | silicone-treated titanium oxide (*5) | 3 |
| 19. | silicone-treated red iron oxide (*5) | 0.7 |
| 20. | silicone-treated black iron oxide (*5) | 0.2 |
| 21. | silicone-treated talc (*6) | 0.7 |
| 22. | mica | 4.5 |
| | Total | 100.0 |
| | Total of component (a) | 20.0 |
| | Total of component (b) | 20.0 |

(*1) KF-56A (Shin-Etsu Chemical Co., Ltd.)
(*2) KF-54HV (Shin-Etsu Chemical Co., Ltd.)
(*3) KP-561P (Shin-Etsu Chemical Co., Ltd.)
(*4) KP-550 (Shin-Etsu Chemical Co., Ltd.)
(*5) powder resulting from hydrophobic surface treatment with KF-9901 (Shin-Etsu Chemical Co., Ltd.)
(*6) powder resulting from hydrophobic surface treatment with AES-3083 (Shin-Etsu Chemical Co., Ltd.)

The resulting lipstick was confirmed to show satisfactory gloss, adhesion and feeling on use and have storage stability.

Example 12

Lip Color
<Preparation of Cosmetic Composition>
A lip color was obtained by
A: dispersing components 11 to 15 on a three-roll mill,
B: uniformly mixing components 1 to 10 at 95° C., and
C: adding A to B, mixing at 85° C., casting in a dish, and cooling.

| | Formulation | % |
|---|---|---|
| 1. | diphenylsiloxy phenyl trimethicone (*1) | balance |
| 2. | silicone alkyl-branched polyglycerin-modified silicone (*2) | 1 |
| 3. | silicone composite powder (*3) | 4 |
| 4. | polymethylsilsesquioxane (*4) | 6 |
| 5. | candelilla wax | 3 |
| 6. | synthetic wax | 5 |
| 7. | dipentaerythrityl hexahydroxystearate/hexastearate/hexarosinate | 3 |
| 8. | hydrogenated polybutene (18 monomers) | 4 |
| 9. | pentaerythrityl tetraisostearate | 10 |
| 10. | isotridecyl isononanoate | 11 |
| 11. | sericite | 1.4 |
| 12. | polyglyceryl-2 triisostearate | 3 |
| 13. | Red #201 | 0.2 |
| 14. | Red #202 | 0.3 |
| 15. | Yellow #4 | 1.1 |
| | Total | 100.0 |
| | Total of component (a) | 47.0 |
| | Total of component (b) | 4.0 |

(*1) KF-56A (Shin-Etsu Chemical Co., Ltd.)
(*2) KF-6105 (Shin-Etsu Chemical Co., Ltd.)
(*3) KSP-100 (Shin-Etsu Chemical Co., Ltd.)
(*4) KMP-590 (Shin-Etsu Chemical Co., Ltd.)

The resulting lip color was confirmed to show satisfactory gloss, adhesion and feeling on use and have storage stability. It can also be used as point make-up at sites other than the lip, for example, as cheek color when coated thinly.

Example 13

W/O Lipstick
<Preparation of Cosmetic Composition>
A W/O lipstick was obtained by
A: dispersing components 10 to 19 on a three-roll mill,
B: uniformly mixing components 1 to 9 at 95° C.,
C: uniformly mixing components 20 to 23 at 85° C., and
D: adding A to B, adding C at 85° C., emulsifying, casting in a stick container, and cooling.

| | Formulation | % |
|---|---|---|
| 1. | diphenylsiloxy phenyl trimethicone (*1) | balance |
| 2. | alkyl-modified partially crosslinked polyether-modified silicone composition (*2) | 3 |
| 3. | partially crosslinked methylphenylpolysiloxane composition (*3) | 1 |
| 4. | alkyl-branched polyether-modified silicone (*4) | 1 |
| 5. | alkyl-modified silicone composite powder (*5) | 3 |
| 6. | ceresin | 5 |
| 7. | inulin stearate | 3 |
| 8. | hydrogenated polyisobutene (6 monomers) | 5 |
| 9. | caprylic/capric triglyceride | 3 |
| 10. | neopentylglycol dicaprylate | 2 |
| 11. | mineral oil | 3 |
| 12. | sorbitan sesquiisostearate | 0.5 |
| 13. | Red #201 | 0.4 |
| 14. | Red #202 | 0.4 |
| 15. | Yellow #4 | 1.6 |
| 16. | silicone-treated titanium oxide (*6) | 3 |
| 17. | silicone-treated red iron oxide (*7) | 0.7 |
| 18. | silicone-treated black iron oxide (*8) | 0.2 |
| 19. | silicone-treated talc (*9) | 0.7 |
| 20. | glycerin | 10 |
| 21. | pentylene glycol | 3 |
| 22. | ethylhexyl glycerin | 0.1 |
| 23. | purified water | 40 |
| | Total | 100.0 |
| | Total of component (a) | 10.4 |
| | Total of component (b) | 5.0 |

(*1) KF-56A (Shin-Etsu Chemical Co., Ltd.)
(*2) KSG-330 (crosslinked silicone ~20%, triethylhexanoin ~80%, Shin-Etsu Chemical Co., Ltd.)
(*3) KSG-18A (crosslinked silicone ~15%, diphenylsiloxyphenyl trimethicone ~85%, Shin-Etsu Chemical Co., Ltd.)
(*4) KF-6048 (Shin-Etsu Chemical Co., Ltd.)
(*5) KSP-441 (Shin-Etsu Chemical Co., Ltd.)
(*6) KTP-09W (Shin-Etsu Chemical Co., Ltd.)
(*7) KTP-09R (Shin-Etsu Chemical Co., Ltd.)
(*8) KTP-09B (Shin-Etsu Chemical Co., Ltd.)
(*9) powder resulting from hydrophobic surface treatment with KP-574 (Shin-Etsu Chemical Co., Ltd.)

The resulting W/O lipstick was confirmed to show satisfactory gloss, adhesion and feeling on use and have storage stability. It can also be used as matte lip when a coating is adjusted.

Example 14

W/O Balm
<Preparation of Cosmetic Composition>
A W/O balm was obtained by
A: uniformly mixing components 1 to 12 at 95° C.,
B: uniformly mixing components 13 to 18 at 85° C., and
C: adding B to A, emulsifying at 85° C., casting in a dish, and cooling.

| | Formulation | % |
|---|---|---|
| 1. | diphenylsiloxy phenyl trimethicone (*1) | balance |
| 2. | partially crosslinked polyether-modified silicone composition (*2) | 3 |
| 3. | partially crosslinked methylpolysiloxane composition (*3) | 1 |
| 4. | silicone alkyl-branched polyether-modified silicone (*4) | 1 |
| 5. | phenyl-modified silicone composite powder (*5) | 1 |
| 6. | vaseline | 3 |
| 7. | synthetic wax | 3 |
| 8. | hydrogenated polyisobutene (24 monomers) | 2 |
| 9. | ethylhexyl palmitate | 3 |
| 10. | diisostearyl malate | 2 |
| 11. | isononyl isononanoate | 3 |
| 12. | butyl paraben | 0.1 |
| 13. | methyl gluceth | 3 |
| 14. | xylitol | 3 |
| 15. | BG | 6 |
| 16. | methyl paraben | 0.1 |
| 17. | allantoin | 0.1 |
| 18. | purified water | 40 |
| | Total | 100.0 |
| | Total of component (a) | 25.7 |
| | Total of component (b) | 2.0 |

(*1) KF-56A (Shin-Etsu Chemical Co., Ltd.)
(*2) KSG-210 (crosslinked silicone ~25%, dimethicone ~85%, Shin-Etsu Chemical Co., Ltd.)
(*3) KSG-15 (crosslinked silicone ~7%, cyclopentasiloxane ~93%, Shin-Etsu Chemical Co., Ltd.)
(*4) KF-6038 (Shin-Etsu Chemical Co., Ltd.)
(*5) KSP-300 (Shin-Etsu Chemical Co., Ltd.)

The resulting W/O balm was confirmed to show satisfactory gloss, adhesion and feeling on use and have storage stability.

It can also be used as a humectant at sites other than the lip, for example, as hand cream and eye cream.

Example 15

Lip Cream
<Preparation of Cosmetic Composition>
A lip cream was obtained by
A: uniformly mixing components 1 to 16 at 95° C., and
B: casting A in a mold and cooling.

| | Formulation | % |
|---|---|---|
| 1. | diphenylsiloxy phenyl trimethicone (*1) | balance |
| 2. | partially crosslinked polyglycerin-modified silicone composition (*2) | 5 |
| 3. | lanolin | 1 |
| 4. | polybutene | 4 |
| 5. | shea butter | 5 |
| 6. | macadamia nut oil | 5 |
| 7. | phenyl-modified silicone composite powder (*5) | 1 |
| 8. | carnauba wax | 10 |
| 9. | beeswax | 5 |
| 10. | hydrogenated polyisobutene (18 monomers) | 24 |
| 11. | hydrogenated polyisobutene (24 monomers) | 3 |
| 12. | triethylhexanoin | 3 |
| 13. | diisostearyl malate | 2 |
| 14. | isotridecyl isononanoate | 3 |
| 15. | tocopherol | 0.1 |
| 16. | stearyl glycyrrhetinate | 0.1 |
| | Total | 100.0 |
| | Total of component (a) | 28.8 |
| | Total of component (b) | 27.0 |

(*1) KF-56A (Shin-Etsu Chemical Co., Ltd.)
(*2) KSG-810 (crosslinked silicone ~30%, mineral oil ~70%, Shin-Etsu Chemical Co., Ltd.)

The resulting lip cream was confirmed to show satisfactory gloss, adhesion and feeling on use and have storage stability.

The invention claimed is:
1. A solid cosmetic composition comprising
   (a) diphenylsiloxy phenyl trimethicone,
   (b) hydrogenated polyisobutene which is composed of 3 to 24 monomers, and soluble with component (a),
   (c) at least one member selected from the group consisting of isotridecyl isononanoate, isononyl isononanoate, triethylhexanoin, ethylhexyl palmitate, caprylic/capric triglyceride, mineral oil, polyglyceryl polyisostearate, and sorbitan sesquiisostearate,
   (d) wax, and
   (e) a phenyl silicone other than component (a),
   wherein the components are combined such that when components (a), (b), (c), and (e) are mixed, component (e) is soluble with the other components, and
   the content of component (e) is 0.1 to 10% by weight of the cosmetic composition.
2. The solid cosmetic composition of claim 1 wherein the content of component (a) is 5 to 50% by weight of the solid cosmetic composition.
3. The solid cosmetic composition of claim 1 wherein the content of component (b) is 0.5 to 30% by weight of the solid cosmetic composition.
4. The solid cosmetic composition of claim 1, further comprising (f) a silicone powder.
5. The solid cosmetic composition of claim 1, for use on lips.

* * * * *